United States Patent [19]

Mayerhofer et al.

[11] Patent Number: 5,066,090
[45] Date of Patent: Nov. 19, 1991

[54] OPTICAL COUPLING ELEMENT HAVING A CONVEX MICROLENS AND THE METHOD OF MANUFACTURE

[75] Inventors: Franz Mayerhofer, Puchheim; Holger Karstensen, Hohenbrunn; Ralf Dietrich, Munich; Werner Spaeth, Holzkirchen, all of Fed. Rep. of Germany

[73] Assignee: Siemens Aktiengesellschaft, Berlin and Munich, Fed. Rep. of Germany

[21] Appl. No.: 569,624

[22] Filed: Aug. 20, 1990

[30] Foreign Application Priority Data

Sep. 12, 1989 [DE] Fed. Rep. of Germany ....... 3930433

[51] Int. Cl.$^5$ ...................... G02B 6/32; B29D 11/00; B24B 1/00
[52] U.S. Cl. .......................... 385/35; 385/14; 359/664; 359/900; 51/284 R
[58] Field of Search ............... 350/96.10, 96.11, 96.17, 350/96.18, 96.20, 416, 417, 320; 51/284 R

[56] References Cited

U.S. PATENT DOCUMENTS

| 4,726,645 | 2/1988 | Yamashita et al. | 350/96.18 |
| 4,826,272 | 5/1989 | Pimpinella et al. | 350/96.20 |
| 4,830,454 | 5/1989 | Karstensen | 350/96.18 |
| 4,867,371 | 9/1989 | Davis et al. | 228/160 |
| 4,875,750 | 10/1989 | Spaeth et al. | 350/96.18 |
| 4,897,711 | 1/1990 | Blonder et al. | 357/74 |
| 4,919,506 | 4/1990 | Covey | 350/96.18 |
| 4,989,934 | 2/1991 | Zavracky et al. | 350/96.11 |
| 4,995,695 | 2/1991 | Pimpinella et al. | 350/96.18 |
| 5,009,481 | 4/1991 | Kinosita et al. | 350/96.18 |
| 5,023,447 | 6/1991 | Masuko et al. | 350/96.24 X |

FOREIGN PATENT DOCUMENTS

| 0164834 | 12/1985 | European Pat. Off. | 228/160 X |
| 0280305 | 8/1988 | European Pat. Off. | 350/96.18 X |
| 0331331 | 9/1989 | European Pat. Off. | 357/74 X |
| 3613643 | 1/1988 | Fed. Rep. of Germany | 350/96.18 X |
| 2-127605 | 5/1990 | Japan | 350/96.18 X |

OTHER PUBLICATIONS

Patent Abstracts of Japan, vol. 8, No. 217(E-270) for Oct. 1984 of Japanese Application No. 59-101881 (Sumitomo Denki) of Jun. 12, 1984.
Patent Abstracts of Japan, vol. 10, No. 27(E-378) for Feb. 1986 of Japanese Application No. 60-187077 (Mitsubishi Denki) of Sep. 24, 1985.

Primary Examiner—Brian Healy
Attorney, Agent, or Firm—Hill, Van Santen, Steadman & Simpson

[57] ABSTRACT

An optical coupling element having a convex, refractive microlens is characterized by a ball having a flat, planar surface being mounted in a through-hole of a carrier lamina with the flat, planar surface extending parallel to a planar surface of the lamina. The coupling element is preferably made by a method which involves forming a through-hole in a lamina, mounting a ball in the through-hole, processing a surface of the ball to form the planar surface that extends parallel to a surface of the lamina. Preferably, a plurality of coupling elements are formed by providing a plurality of through-holes in an enlarged carrier and after processing, each individual coupling element is then separated from this enlarged carrier.

11 Claims, 2 Drawing Sheets

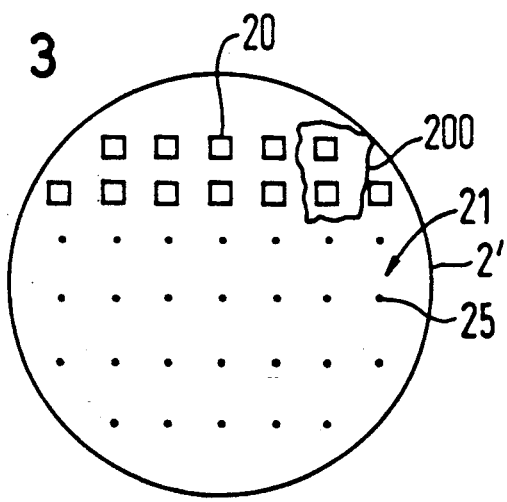
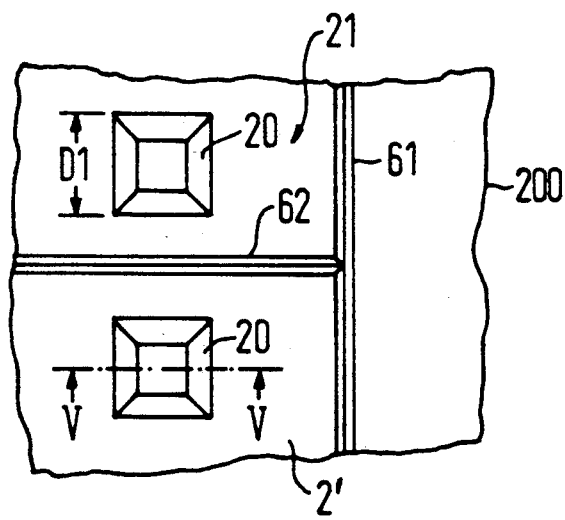
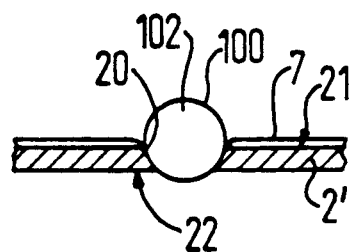
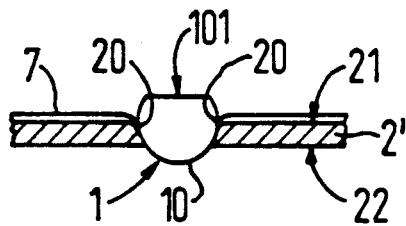
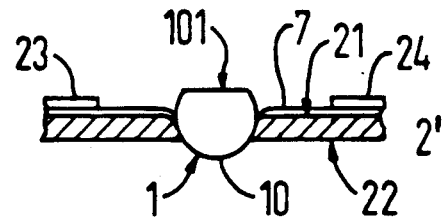

OPTICAL COUPLING ELEMENT HAVING A CONVEX MICROLENS AND THE METHOD OF MANUFACTURE

BACKGROUND OF THE INVENTION

The present invention is directed to an optical coupling element having a convex, refractive microlens being mounted in a through-hole shaped like a truncated pyramid or cone of a flat carrier lamina having flat surfaces, with one of the flat surfaces being securable to a body that carries a light-emitting and/or light-receiving optical component which light passes through the microlens. The invention is also directed to a method of manufacturing the optical coupling element having the microlens.

An optical coupling element of the above-mentioned type is disclosed in EP 0 280 305 A1. In this known element, the microlens is composed of a sapphire ball that is secured with a glass solder in a hole shaped like a truncated pyramid in a carrier lamina. For fastening the carrier lamina to a body, the carrier lamina is provided with metallizations for soldering.

Due to the rather high spherical aberrations, spherical lenses are not well-suited for coupling optics that should be extremely low-loss.

European Patent Application No. 88 118 337.0 and U.S. Pat. No. 4,830,454, whose disclosure is incorporated herein by reference thereto, each disclose a plano-convex lens in the form of a ball of silicon or germanium that is flattened on one surface. This spherical planar convex lens can be used as a coupling element which achieves a high coupling efficiency.

SUMMARY OF THE INVENTION

The object of the present invention is to provide an optical coupling element with a microlens that is simple to manufacture and that has a high coupling efficiency.

This object is achieved by an improvement in a coupling element having a convex, refractive microlens, the element having a flat carrier lamina of silicon having a through-hole shaped like a truncated cone or pyramid, the microlens being arranged and secured in the hole, the carrier lamina having a flat surface for securing to a body that carries a light emitting and/or light receiving optical component that emits light or light to be received that penetrates the microlens. The improvements are that the microlens is composed of a plano-convex lens in the form of a ball composed of silicon and has a flattened planar surface that is essentially parallel to a flat side of the carrier lamina so that the emitted light or the light to be received will penetrate through this planar surface.

An advantageous method for manufacturing the optical coupling element with the microlens, particularly an element as mentioned hereinabove, comprises the steps of providing a carrier lamina, providing a through-hole having the shape of a truncated cone or a truncated pyramid in the carrier lamina, securing the ball of transparent material in the hole with a portion of the ball projecting above a surface of the carrier lamina to form a spherical cap and then processing the ball to form a planar surface or face in the spherical cap. Preferably, the step of providing the carrier lamina provides a lamina composed of anisotropically etchable material and the step of forming the through-hole comprises anisotropically etching the carrier lamina. The step of securing or fastening the ball in the through-hole is preferably accomplished by utilizing a glass solder. The step of producing the planar face is preferably by grinding the planar face in the spherical cap.

Preferably, the method forms a plurality of optical coupling elements at a single time, and this is accomplished by providing a large carrier lamina or wafer and forming a plurality of through-holes that have a pyramid shape in this lamina, securing a ball of transparent material in each of these holes with a portion of the ball extending from one flat surface of the carrier lamina to form the spherical cap, processing each of the balls by grinding all of the spherical cap to form a planar face for each of the balls, and then subsequently separating the large carrier lamina into a plurality of individual portions, with each portion containing one of the balls having a planar surface. The step of separating can be facilitated by etching grooves or trenches at the time of forming the through-holes to sub-divide the large carrier lamina into a plurality of individual portions, each having a single through-hole.

According to the method of the invention, the ultimate shaping of the plano-convex lens is advantageously co-involved in the manufacturing sequence of the coupling element.

Other advantages and features of the invention will be readily apparent from the following description of the preferred embodiments, the drawings and claims.

BRIEF DESCRIPTION OF THE DRAWINGS

FIG. 3 is a plan view of a large carrier lamina in the form of a silicon wafer having a plurality of holes shaped like truncated cones;

FIG. 4 is an enlarged plan view of a portion of the wafer of FIG. 3;

FIG. 5 is a cross sectional view with portions in elevation taken along the lines V—V of FIG. 4 after securing a ball in the through-hole;

FIG. 6 is a cross sectional view with portions in elevation similar to FIG. 5 after processing the ball; and FIG. 7 is a cross sectional view similar to FIG. 5 after applying the metallizations on the carrier lamina.

DESCRIPTION OF THE PREFERRED EMBODIMENTS

Figure 1:
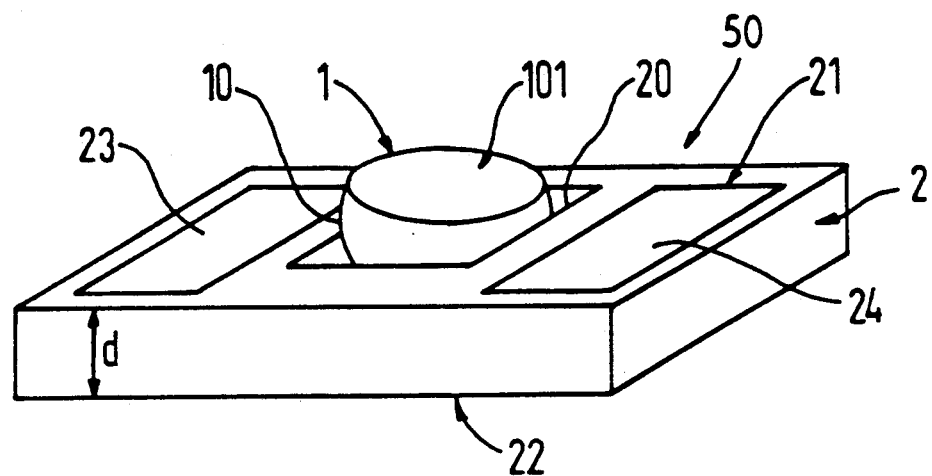
FIG. 1 is a perspective view of a coupling element in accordance with the present invention.
Figure 2:
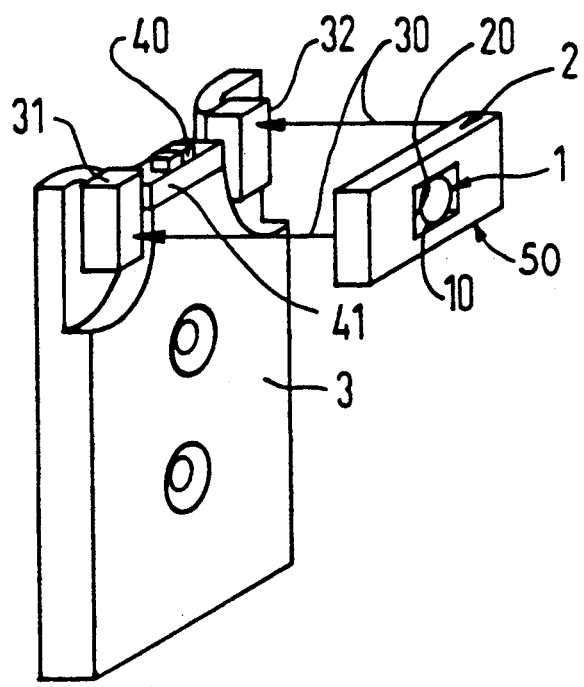
FIG. 2 is an exploded perspective view of a possible laser-lens unit utilizing the coupling element of the present invention.

The principles of the present invention are particularly useful when incorporated in a coupling element, generally indicated at 50 in FIG. 1. The coupling element 50 is composed of a carrier lamina, generally indicated at 2, which is composed of silicon and has flat, planar surfaces, generally indicated at 21 and 22, and also is provided with a hole 20 shaped like a truncated pyramid (as best illustrated in FIG. 4) that extends through the entire thickness d of the lamina 2. The coupling element also includes a microlens, generally indicated at 1, which is secured in the hole 20 and has the form of a flattened ball 10 having a planar surface 101 which extends essentially parallel to the flat surfaces 21 and 22 of the lamina 2. The lamina 2 is provided with metallizations 23 and 24 for soldering, which are applied on a flat surface of the lamina 2, preferably the flat surface 21, which has the planar surface 101 of the lens 1 adjacent thereto.

For manufacturing a laser-lens unit, the coupling element 50 of FIG. 1 has the metallized portions 23 and 24 of the surface 21 soldered to a body 3 which carries a semiconductor laser. As shown, the body 3 is composed of metal. This body 3 carries a laser diode 40 that, for example, is insulated from the metal body 3 by a ceramic layer or insulator 41. The body 3 has metallized glass clumps or blocks 31 and 32 which are positioned on both sides of the laser diode 40. The coupling element 50 has its metallized flat surface 2 brought into contact with these glass clumps or blocks 31 and 32 by being moved in the direction indicated by the arrows 30. Fastening to the glass blocks 31 and 32 will occur by soldering after the element has been adjusted to position the lens 1 in the exact alignment with the laser diode 40.

The manufacturing of the coupling elements 50 illustrated in FIG. 1 can occur when a plurality of through-holes 20, shaped like truncated pyramids (see FIG. 4), are etched in a larger carrier lamina or wafer 2' which has a form of a wafer of silicon. These through-holes are etched by a conventional photolithographic and anisotropic etching in a desired pattern of rows and columns. As illustrated in FIG. 3, points, such as 25, show the center of additional holes 20 that are not completely shown. In addition to etching the holes 20, parting trenches or grooves, such as 61 and 62 (FIG. 4) are etched between the holes to define the portions of the enlarged carrier lamina 2', which portions will form the actual carrier lamina 2 of each individual coupling element 50. The parting trenches or grooves 61 and 62 will simplify the separation of the individual elements from the larger carrier lamina 2' after completion of the formation of the coupling element.

After the holes 20 have been produced, the carrier lamina 2' is covered in a large area with a glass solder 7 (FIGS. 5-7) on a flat surface, preferably the flat surface 21 to form a glazed surface. The glazed surface is the one on which the holes 20 shaped like the truncated pyramids, have their larger diameter D1.

Then, polished silicon balls 100 that are dimensioned so that a spherical cap 102 that will project above the glazed flat surface 21 are introduced into each of the holes 20 and secured in these holes by being glazed or soldered. As illustrated in FIG. 5, the spherical cap 102 projects above the glazed surface 21.

In the next step, the projecting spherical caps 102 are all ground off and polished to form the flattened balls 10 with the planar faces 101. The planar face 101 is parallel to the flat side 21 of the carrier lamina 2'. A particular advantage of the method is that all the balls 100 of a large carrier lamina 2' can be simultaneously processed in one work cycle to form each of the flattened balls 10.

In the next step, metallization, such as 23 and 24, that will serve as soldering areas are applied on the glazed flat surface 21 between the flattened balls 10. The metallizations 23 and 24 can be produced in a conventional manner utilizing silicon technology.

Thereafter, the individual coupling elements of FIG. 1 having only one microlens 1 can be produced by parting the large carrier lamina 2 in the areas between the openings 20, for example by sawing or breaking, which sawing or breaking can be facilitated by the trenches or grooves 61 and 62.

Preferably, the flattened ball 10 is anti-reflection coated by applying one or more layers having a defined refractive index. This is expediently implemented before the application of the metallization, such as on the surface 21, and can be accomplished by standard methods for applying anti-reflection coatings.

In the exemplary embodiment, a silicon wafer having a thickness d of 0.381 mm is employed as the carrier lamina 2'. This lamina is anisotropically etched to form the openings 20 and then has a large area glazed with a conventional glass solder. An example of a conventional glass solder is a glass solder IP 754, which is sold by Innotech Company.

Silicon balls were then glazed or sawed into this wafer 2' in that the wafer was held at a temperature of 700° C. in a furnace for approximately 20 minutes. This step is advantageously uncritical. The glazed-in balls are then manually ground and polished to the desired thickness. The ground and polished, flattened balls are subsequently provided with an anti-reflection coating on both sides by a vapor deposition of a thin layer of $Sc_2O_3$. SiO or $Si_3N_4$ can be used instead of the $Sc_2O_3$. Dependent on the material, the coating can occur by either vapor deposition, by sputtering or by utilizing a CVD method. Advantageously, no high-precision demands are needed for making such coatings. Under these circumstances, a reflectivity that remains below 1% and even below 0.5% at each surface of the lens can be achieved for an operating wavelength of 1.3 $\mu$m.

Although various minor modifications may be suggested by those versed in the art, it should be understood that we wish to embody within the scope of the patent granted hereon all such modifications as reasonably and properly come within the scope of our contribution to the art.

We claim:

1. A method for manufacturing an optical coupling element having a microlens mounted in a through-hole having a shape of a truncated cone in a carrier lamina with a flattened surface extending parallel to one of the surfaces of the carrier, said method comprising the steps of providing a carrier lamina, forming a through-hole having a shape like a truncated cone in the carrier lamina, securing a ball of transparent material in the through-hole with a portion of the ball projecting at least above one flat surface of the carrier lamina to form a spherical cap, and then processing the spherical cap to form a planar surface in the ball extending parallel to the one flat surface of the carrier lamina.

2. A method according to claim 1, wherein the step of providing the carrier lamina provides a carrier lamina composed of anisotropically etchable material and the step of forming the through-hole comprises anisotropically etching the through-hole into the carrier lamina.

3. A method according to claim 2, wherein the step of securing the ball in the through-hole comprises applying a glass solder and soldering the ball in said hole.

4. A method according to claim 3, wherein the step of processing the spherical cap to form the planar surface includes forming the planar surface by grinding.

5. A method according to claim 1, wherein the step of securing includes applying a glass solder and soldering the ball in the hole.

6. A method according to claim 5, wherein the step of processing includes grinding the spherical cap.

7. A method according to claim 1, wherein the step of processing the spherical cap includes grinding the planar surface into the spherical cap.

8. A method according to claim 1, wherein the manufacturing of the optical element comprises providing an enlarged carrier lamina, producing a plurality of through-holes in the carrier lamina, securing a ball in each of the through-holes, the step of processing includes simultaneously processing all of the spherical caps of each of the balls and the method further includes separating a plurality of optical coupling elements, each having a single microlens, by parting the enlarged carrier lamina into smaller portions having only one ball secured in one opening.

9. A method of forming a plurality of optical coupling elements, each having a microlens secured in a flat carrier lamina, said microlens having a planar surface extending parallel to a plane surface of the carrier lamina, said method comprising the steps of providing a silicon wafer; etching a plurality of pyramid-shaped through-holes in said silicon wafer with the through-holes being arranged in a pattern; securing a ball of transparent material in each of the through-holes with a portion of the ball extending above one flat surface of the wafer to form a spherical cap for every ball; forming a plurality of flattened balls having a planar surface by processing each of the spherical caps; and then dividing the wafer into a plurality of carrier lamina with each carrier lamina having a single flattened ball to produce a plurality of coupling elements.

10. A method according to claim 9, which includes providing metallizations on said one surface of the wafer prior to separating the plurality of coupling elements from said wafer.

11. A method according to claim 9, wherein the step of etching includes forming a plurality of grooves to define a plurality of carrier lamina on the wafer, and said step of dividing separates the wafer at said grooves.

* * * * *